US012439931B2

(12) United States Patent
Neuman

(10) Patent No.: US 12,439,931 B2
(45) Date of Patent: Oct. 14, 2025

(54) COLD SMOKE SMOKER

(71) Applicant: FRANK BRUNCKHORST CO., LLC, Brooklyn, NY (US)

(72) Inventor: Andrew Neuman, Sarasota, FL (US)

(73) Assignee: FRANK BRUNCKHORST CO. LLC, Brooklyn, NY (US)

( * ) Notice: Subject to any disclaimer, the term of this patent is extended or adjusted under 35 U.S.C. 154(b) by 792 days.

(21) Appl. No.: 17/311,251

(22) PCT Filed: Jul. 24, 2020

(86) PCT No.: PCT/US2020/043535
§ 371 (c)(1),
(2) Date: Jun. 4, 2021

(87) PCT Pub. No.: WO2021/016572
PCT Pub. Date: Jan. 28, 2021

(65) Prior Publication Data
US 2022/0046936 A1 Feb. 17, 2022

Related U.S. Application Data

(60) Provisional application No. 62/878,658, filed on Jul. 25, 2019.

(51) Int. Cl.
A23B 4/052 (2006.01)
(52) U.S. Cl.
CPC ................... A23B 4/0523 (2013.01)

(58) Field of Classification Search
CPC ........... A23B 4/00; A23B 4/005; A23B 4/015; A23B 4/32; A23B 5/00; A23B 5/005;
(Continued)

(56) References Cited

U.S. PATENT DOCUMENTS 2,833,201 A  5/1958 Simank
4,827,903 A  5/1989 Kim
(Continued)

FOREIGN PATENT DOCUMENTS

CN   2544532 Y   4/2003
CN   204519215 U  8/2015
(Continued)

OTHER PUBLICATIONS

Notice of Reasons for Refusal dated Sep. 12, 2023, from Japanese Application No. 2022-502398, 6 sheets.
(Continued)

Primary Examiner — Sang Y Paik
Assistant Examiner — Bonita Khlok
(74) Attorney, Agent, or Firm — KATTEN MUCHIN ROSENMAN LLP

(57) ABSTRACT

Disclosed herein is a cold smoke smoker for cold smoking foods using materials heated to a controlled temperature for use in food service, commercial, and residential environments. The cold smoke smoker comprises a blower fan which blows smoke up through a vent, past an ignition plate smoking the materials, and through tubing into a food package containing food. The materials that are smoked can include natural wood chips, herbs, spices, or blends of the fore mentioned materials.

17 Claims, 8 Drawing Sheets

(58) Field of Classification Search
CPC ... A23B 4/044–056; A23L 27/27; A23L 5/17; A23L 15/30; A23L 27/88; H05B 1/0261; H05B 2203/032; H05B 3/0076; B65B 31/024; B65B 31/021; B65B 31/04; A47J 37/07–0772; A47J 37/079
USPC .......................................... 99/482; 126/21 A
See application file for complete search history.

(56) References Cited

U.S. PATENT DOCUMENTS

| | | | |
|---|---|---|---|
| 5,368,872 A * | 11/1994 | Davis, Jr. | A23B 4/052 99/473 |
| 5,967,027 A | 10/1999 | Higashimoto | |
| 8,574,652 B2 | 11/2013 | Ablett | |
| 9,198,443 B2 | 12/2015 | Davis | |
| 2009/0020109 A1 * | 1/2009 | Rheault | A47J 33/00 165/185 |
| 2014/0290641 A1 * | 10/2014 | Worrell | F24C 15/2042 126/299 D |
| 2014/0360387 A1 | 12/2014 | Bogdon | |
| 2015/0289718 A1 * | 10/2015 | Gross | F23Q 7/04 126/25 B |
| 2016/0348909 A1 * | 12/2016 | Tissan | F23Q 7/02 |
| 2017/0224159 A1 * | 8/2017 | Ohler | A47J 37/0704 |
| 2018/0139974 A1 * | 5/2018 | Flood | A23B 4/0523 |
| 2018/0332866 A1 * | 11/2018 | Mahan | B65B 31/024 |
| 2019/0290064 A1 * | 9/2019 | Colston | A47J 37/07 |
| 2020/0107565 A1 * | 4/2020 | Swayne | A23L 13/428 |
| 2020/0214304 A1 * | 7/2020 | Garces | A23B 4/052 |

FOREIGN PATENT DOCUMENTS

| | | |
|---|---|---|
| CN | 105685763 A | 6/2016 |
| CN | 109907103 A | 6/2019 |
| EP | 0271746 B1 | 9/1991 |
| EP | 2033524 A1 | 3/2009 |
| EP | 2638805 A1 | 9/2013 |
| EP | 3249303 B1 | 9/2019 |
| JP | S56-101787 U | 8/1981 |
| JP | H02-119742 A | 5/1990 |
| JP | H03-005383 U | 1/1991 |
| JP | H06-292503 A | 10/1994 |
| JP | H09-000148 A | 1/1997 |
| KR | 2020120001913 U | 3/2012 |
| WO | 2013111005 A1 | 8/2013 |
| WO | 2016092445 A1 | 6/2016 |

OTHER PUBLICATIONS

Patent Examination Report 1 dated Sep. 21, 2023, from New Zealand Application No. 783991, 3 sheets.
Notice of Acceptance dated Oct. 9, 2023, from Australian Application No. 2020316107, 3 sheets.
First Examination Report dated Dec. 5, 2022, from Australian Application No. 2020316107, 3 sheets.
Communication pursuant to Rule 164(1) EPC dated Oct. 9, 2023, from European Patent Application No. 20844024.8, 16 sheets.
Notice of Reasons for Rejection dated Feb. 7, 2023, from Japanese Patent Application No. 2022-502398, 5 sheets.
International Search Report and Written Opinion mailed Nov. 11, 2020, from PCT/US2020/043535, 12 sheets.
Notification of the Second Office Action issued Apr. 19, 2024, from Chinese Patent Application No. 202080051737.X, 24 sheets including English translation.
Yichun Qu, Li Li; Physical Chemistry Experiments; Peking University Press; Heilongjiang University Press; Dec. 31, 2015; pp. 227-228; ISBN 978-7-81129-962-5, 8 sheets including English translation.
First Office Action issued Nov. 15, 2023, from Chinese Patent Application No. 202080051737.X, 28 sheets including English abstract.

* cited by examiner

COLD SMOKE SMOKER

CROSS-REFERENCE TO RELATED APPLICATION

This application is a 371 of international PCT/US20/43535, with an international filing date of Jul. 24, 2020, which claims priority to U.S. Provisional Application Ser. No. 62/878,658, filed Jul. 25, 2019, the entire contents of which are hereby incorporated by reference in their entirety.

BACKGROUND

The cold smoke process uses natural wood chips, herbs, spices or a blend ("material(s)") of the fore mentioned materials to infuse food with a smell and taste that is representative of the materials used without actually cooking the product. The food is typically maintained at 60°-90° F. during the cold smoke process. Each material requires different temperatures for optimal extraction of the material's flavor and smell. Traditional cold smoke guns use a real flame from a lighter (~3,000° F.) which is not optimal for extraction of the materials for the purpose of infusing food with flavor and smell. For example, heating some materials to such a high temperature can cause extraction of toxins or other unpleasant odors not conducive to the cold smoke process. There are currently multiple devices available that sell "smoke guns" that are used to cold smoke foods. However, a device that can smoke materials at a controlled temperature does not exist.

SUMMARY

Disclosed herein is a machine that is optimal for cold smoking foods using distinct features that are optimal for both foodservice/commercial and residential environments. In addition to the machinery, the cold smoke Smoker can smoke natural wood chips, herbs, spices or a blend of the fore mentioned materials.

BRIEF DESCRIPTION OF THE DRAWINGS

The details of the invention may be appreciated in accordance with one or more embodiments of the present invention illustrated in the following drawings.

DETAILED DESCRIPTION

Figure 1:
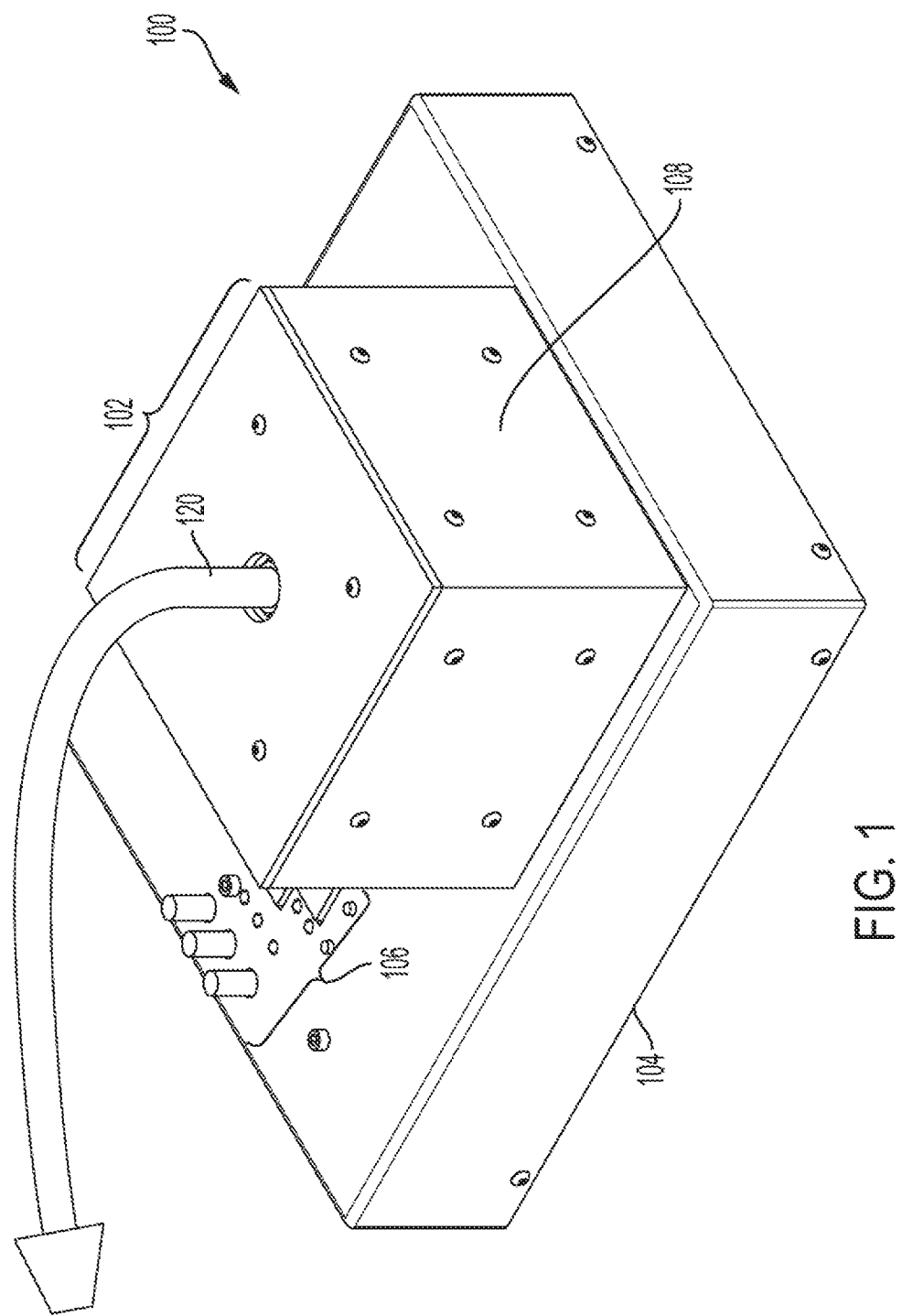
FIG. 1 depicts a perspective view of the cold smoker.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Referring first to FIG. 1, depicted is a perspective view of cold smoke smoker (hereinafter "smoker") 100. Smoker 100 generally comprises ignition chamber 102, smoker body 104, and smoker controls 106. The material(s) to be smoked are placed in the ignition chamber 102 and heated. Smoker controls 106 are generally used to control operation of smoker 100, such as the desired temperature of ignition chamber 102, the on/off state of smoker 100, and any other indicators or displays. Smoker body 104 comprises the circuitry required to control and power smoker 100 such as a power supply, PCB boards, processors, etc.

It should be obvious to one of ordinary skill in the art that the shape, size, and or materials of ignition chamber 102 and smoker body 104 can be varied according to intended use or design specifications. For example, ignition chamber 102 or smoker body 104 may be any desired shape such as rectangular, round, oval, etc. The materials used in the construction of ignition chamber 102 or smoker body 104 may also be varied. For example, smoker body 104 may be formed from an industrial and FDA approved plastic or plastic composite whereas the exterior surfaces of ignition chamber 102 may be formed from stainless steel in order to withstand a variety of operating temperatures of smoker 100.

The types of controls or displays described with respect to smoker controls 106 may also be varied. For example, in some embodiments, physical buttons or switches may be employed. Or, in other embodiments, the smoker controls can entirely use a single touch screen display for control and display. It should be obvious that any combination of controls or displays can be utilized in connection with smoker controls 106 as long as they allow the described functions and required displays described herein to be controlled and displayed.

Figure 2:
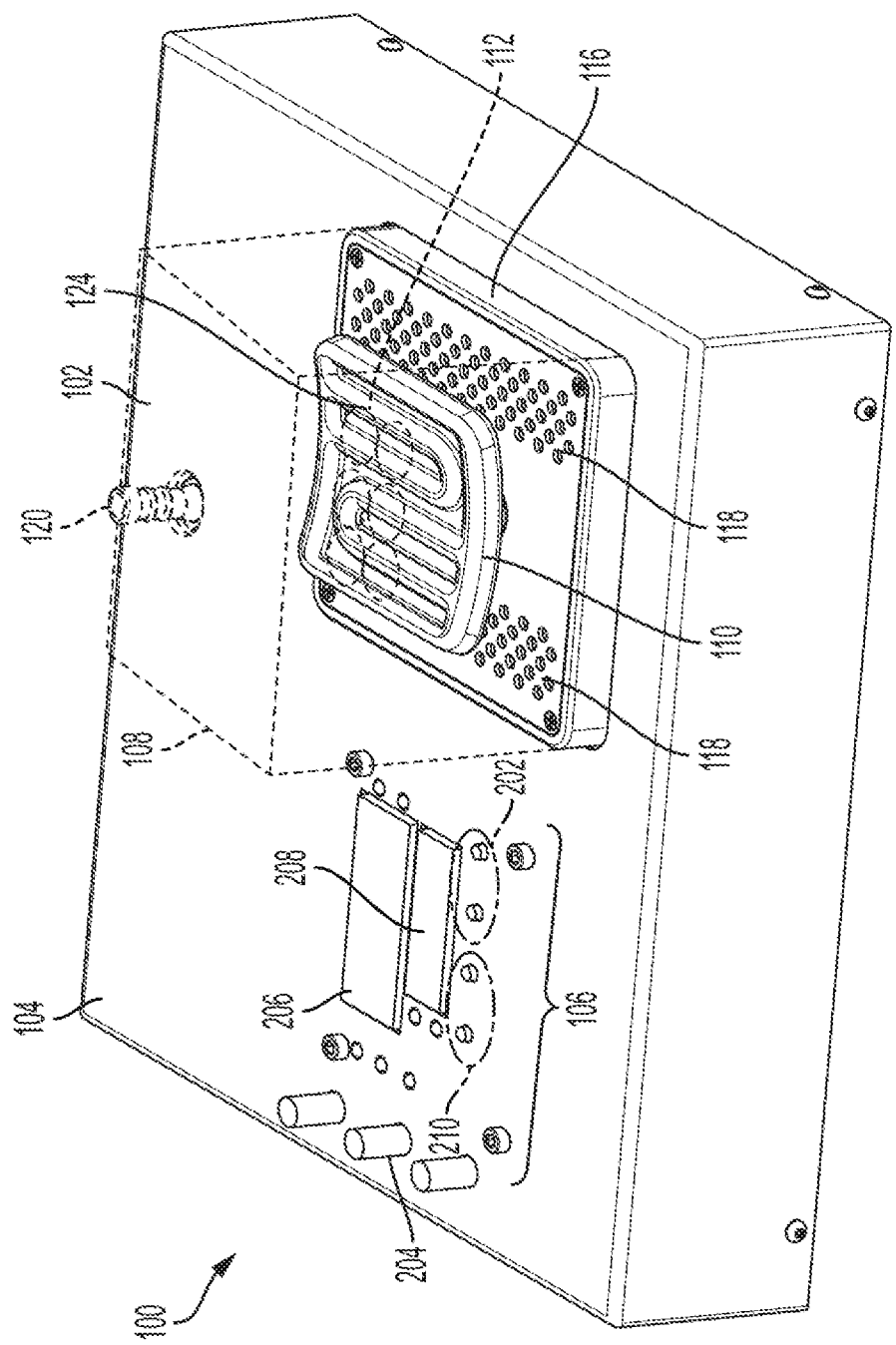
FIG. 2 depicts the cold smoker with the ignition chamber cover shown in phantom.

FIG. 2 depicts smoker 100 of FIG. 1 with the ignition chamber cover 108 shown in phantom to show the internal configuration of ignition chamber 102. FIG. 2 also depicts smoker controls 106 in more detail. Ignition chamber 108 is releasably coupled to smoker body 104 in order to allow materials to be placed on ignition plate 110 which is used to heat materials 112 placed thereon. The open bottom of ignition chamber cover 108 nests with the lip 116 of raised vent plate 114 when placed thereon to prevent the escape of smoke from ignition chamber 102. In some embodiments, lip 116 may be covered with rubber or foam to ensure that vent plate 114 forms an airtight seal with ignition chamber cover 108.

In some embodiments, lip 116 and ignition chamber cover 108 may form a snap fit connection so that ignition chamber cover 108 is not easily dislodged from smoker 100. Further, a latch or other locking mechanism may be used to secure ignition chamber cover 108 to lip 116.

Ignition plate 110 preferably has a "cup" shaped curved surface to better hold materials 112. As shown, the materials may be placed directly on ignition plate 110, creating direct contact between materials 112 and ignition plate 110. In some embodiments, ignition plate 110 may comprise a secondary removable plate which serves as a materials plate 122 for holding materials 122. Materials plate 122 allows materials 112 to sit close to ignition plate 110 but avoids direct contact with ignition plate 110, allowing for later cleanup. Materials plate 122 helps to extend the life of ignition plate 110 and allows for the removal of materials plate 122 with any ashes to be cleaned after the smoking process is completed.

Ignition plate 110 preferably comprises a plurality of thermocouples 124 spaced within ignition plate 110 to ensure even heating of materials 112. Ignition plate 110 is preferable an electronic heating element because many commercial environments do not allow for the use of open flames. Examples of electric heating elements include, but are not limited to, coils, cartridges, cast-in heaters, infrared heaters, and flexible kapton heaters. Preferably, ignition plate 110 is a ceramic infrared heater which allows desired temperatures to be reached quickly and efficiently and allows a stable temperature to be maintained and controlled during smoking.

Vent plate 114 comprises a plurality of vent sections 118 surrounding the sides of heating element 110. The perforations in vent plate 118 allow forced air to push any produced smoke upward from heating element 110 through smoke vent 120.

Smoke vent 120 is preferably on a top surface of ignition chamber cover 108, and not the side, to take advantage of natural convection, meaning that hot air is always going to rise and stay at the top. This allows the smoker 100 to have a "chimney effect," creating greater efficiency while taking advantage of natural physics. If smoke vent 120 were on the side of ignition chamber cover 108, there would lack efficiency by not taking advantage of the convection air.

Smoker controls 106 comprise temperature controls 202, power control switch 204, primary display 206, secondary display 208, and setting buttons 210. Temperature controls 202 are used to raise or lower the desired temperature of ignition plate 110 which is displayed on secondary display 208. The actual current temperature of ignition plate 110 is shown on primary display 206. This allows a user to see a comparison between the desired temperature and the actual temperature of ignition plate 110.

Power control switch 204 may utilize any type of switch, such as a toggle switch, to toggle power on/off to smoker 100 and/or the fan of smoker 100. Power control switch 204 is preferably a physical/analog switch to ensure that power to smoker 100 or the fan can be shut off in case of any emergencies that may occur. Further, power control switch 204 may be located anywhere on body. Two separate power control switches 204 are preferably utilizes, a first to turn power on/off from smoker 100 and a second to turn power on/off to the fan of the smoker.

Setting buttons 210 allow a user to control other functions of the device as is known in the art. For example, setting buttons 210 may allow a user to set a date/time for the device, select predefined temperature setting for different types of materials 112, set a timer for smoker 100, etc. One of the setting buttons 210 may be reserved as a start/stop button which starts or stops the smoking process independent of the power control switch 204. As previously discussed, setting temperature controls 202 and/or setting buttons 210 may utilize a variety of form factors, such as arrow buttons or a universal touch screen.

Figure 3:
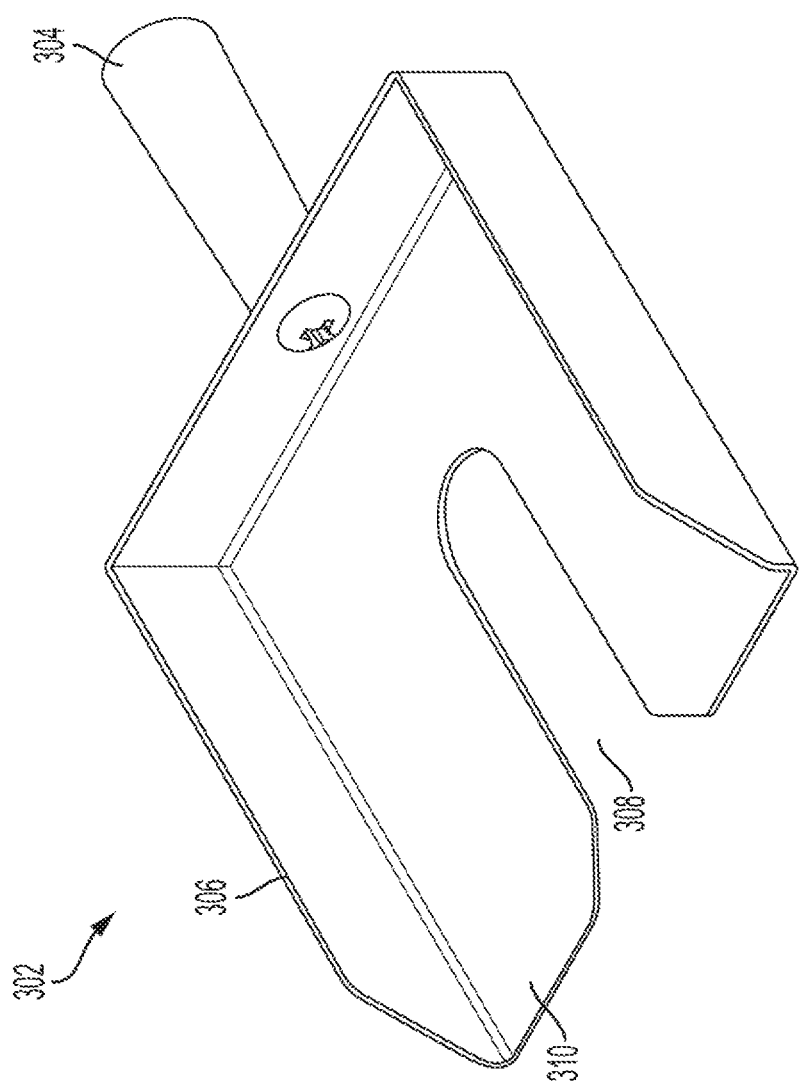
FIG. 3 depicts a pan for cleaning ashes in isolation.

Turning next to FIG. 3, depicted is pan 302 which is utilized when cleaning ashes from ignition plate 110 when ignition chamber cover 108 has been removed. Pan 302 generally comprises handle 304, vertical sidewalls 306, cutout 308, and flat base 310. Flat base 310 preferably has a length and width approximately matching that of vent plate 114. Vertical sidewalls 306 help to prevent any ashes placed thereon from escaping flat base 310 during use.

Figure 4:
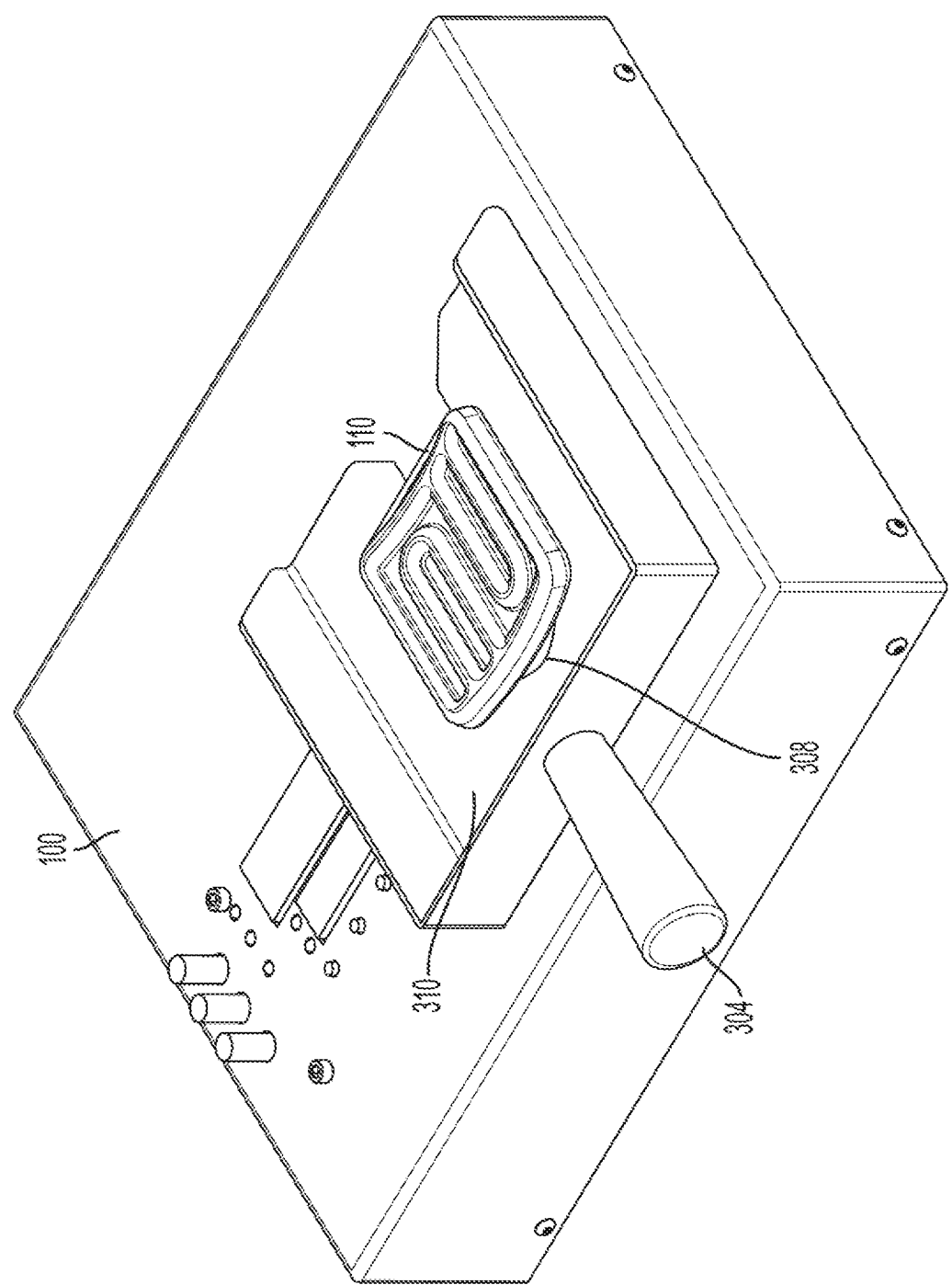
FIG. 4 depicts the pan used with the cold smoker.

FIG. 4 depicts pan 302 in use with smoker 100. As shown, cutout 308 allows pan 302 to be slide under ignition plate 110 until the curved end of cutout 308 abuts a bottom of ignition plate 110. The cutout 308 is wider than the bottom post of ignition plate 110, but less in width than the "cup" of ignition plate 110 so that all vent sections 118 are covered when pan 302 is in place. This allows any ashes to be swept off of ignition plate 110 onto flat base 310 and prevents the ashes from inadvertently falling into smoker body 104 through vent sections 118. After the ashes are disposed, smoker 100 is read for a next use.

Figure 5:
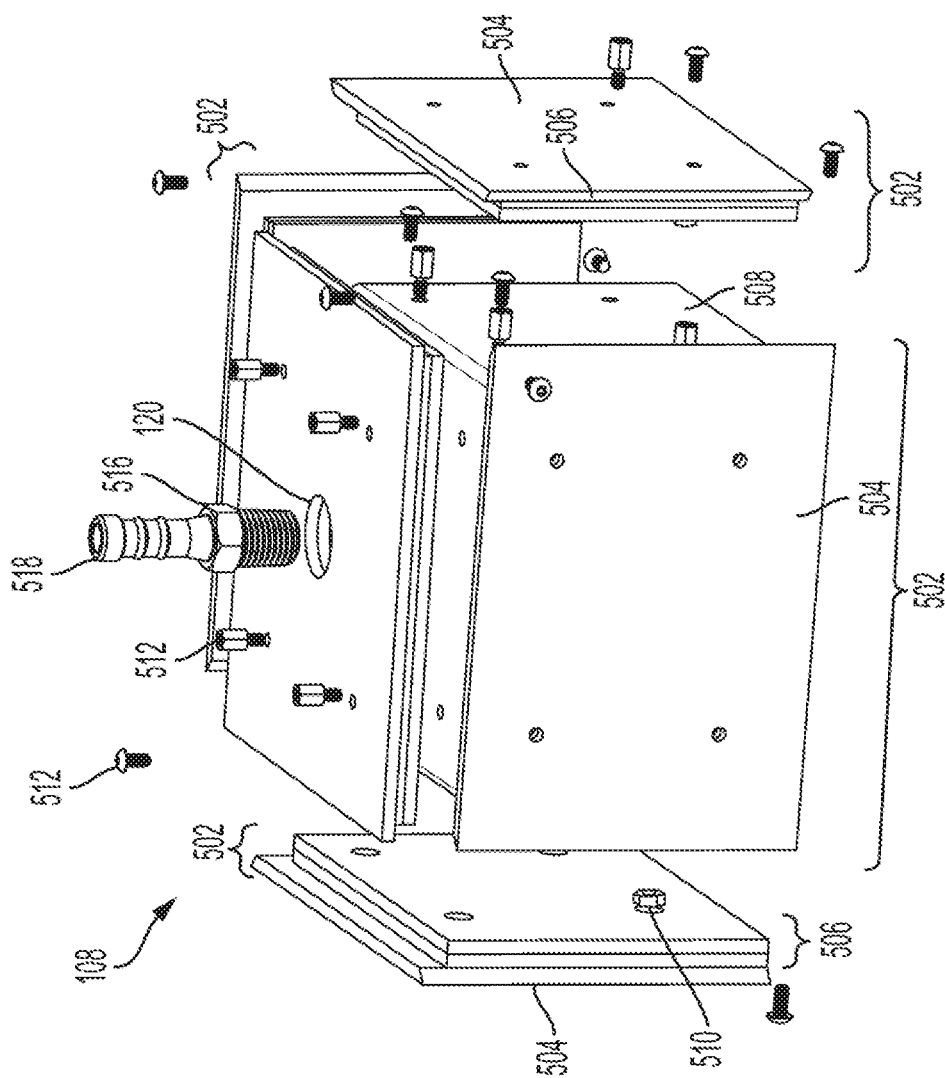
FIG. 5 depicts an exploded view of the ignition chamber cover.

FIG. 5 depicts an exploded view of an embodiment of ignition chamber cover 108 in isolation. Each of the five sides 502 of ignition chamber cover 108 preferably has the same construction comprising outer layer 504, insulating layer(s) 506, and inner layer 508, the layers being coupled together by nuts 510 and bolts 512. Outer layer 504 and inner layer 508 are preferably formed from stainless steel to help with the cleaning and sterilization process and is the preferred material when used in a foodservice setting.

Because the ignition chamber 102 can get very hot during the smoking process, one or more insulating layer(s) 506 are sandwiched between inner layer 504 and outer layer 508. Materials suitable for use in insulating layer(s) include foam, fiberglass, wood, etc., or any combination of insulating materials.

A combination of nuts 510 and bolts 512 placed through sides 502 are used to secure layers 504, 506, and 508 together. However, any other known method of coupling these layers may also be utilized such as adhesives or welding.

Top surface 514 is similar in construction to sides 502, but includes smoke vent 120. Smoke vent 120 preferably has a threaded interior which mates with threads on tubing attachment 516. An end of tubing attachment 516 preferably has a plurality of concentric rings 518 which help to retain the tubing while still allowing it to be replaced as is known in the art.

Figure 6:
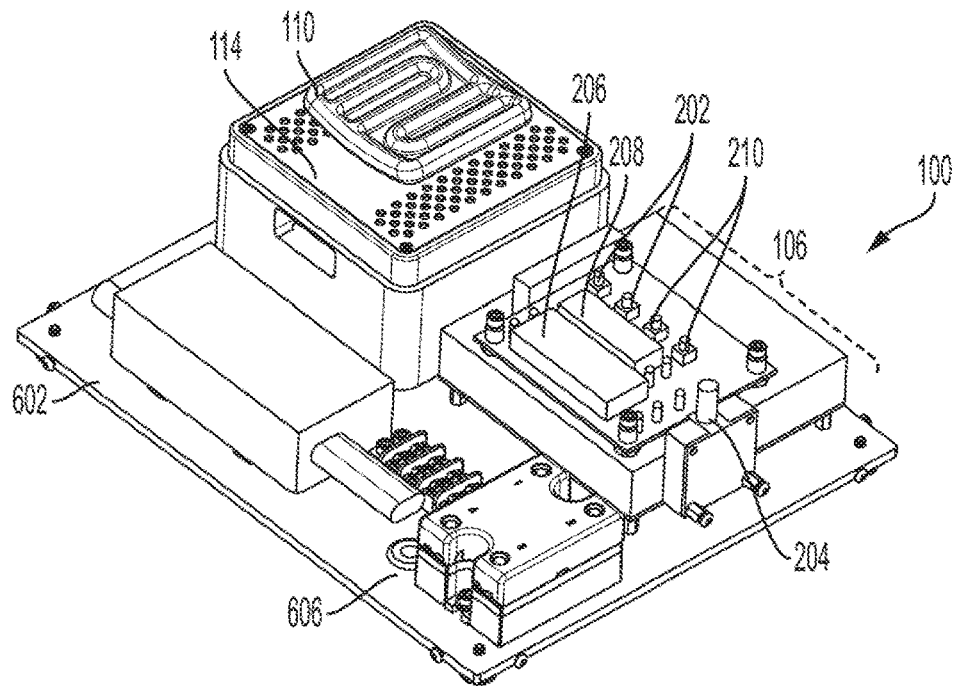
FIG. 6 depicts a perspective view of the cold smoker with the ignition chamber cover and the cover for the smoker body removed.

FIG. 6 depicts a perspective view of smoker 100 with ignition chamber cover 108 and the cover for smoker body 104 both removed. All of the various parts of smoker 100 are affixed to smoker base 602 which is preferably formed from a sheet of stainless steel with through holes for affixing the various depicted components. Power supply 604 couples power from a wall outlet to smoker 100 and the other components such as ignition plate 110 and smoker controls 106. Preferably, power supply 604 is a 20 amp power supply, which is sufficient for most uses of smoker 100. However, it should be obvious that any size power supply can be utilized depending upon the requirements of smoker 100. One of the power control switches 204 preferably controls power flow from power supply 604 to smoker 100.

In some embodiments, ignition plate 110 also comprises its own power control switch 204 for turning power on/off to ignition plate 110. This allows direct control over the power supplied from power supply 604 to the fan, ignition plate 110, and the smoker 100 overall. Controlling each component in this manner allows the user to turn smoker 100, set the desired temperature of the ignition plate 110 without it heating up, then turning on the ignition plate 110, allowing it to reach the desired temperature, and then starting the fan once the ignition plate 100 has reached the correct temperature.

Smoker 100 further comprises breaker 606 which can turn off power to ignition plate 110, smoker controls 106, or smoker 100. For example, breaker 100 may include an "Auto Off" feature which shuts smoker 100 it hasn't been used for a set period of time. The breaker 606 can also disconnect power supply 604 if any surges are detected or any other malfunction, such as too high a temperature, occurs.

Figure 7:
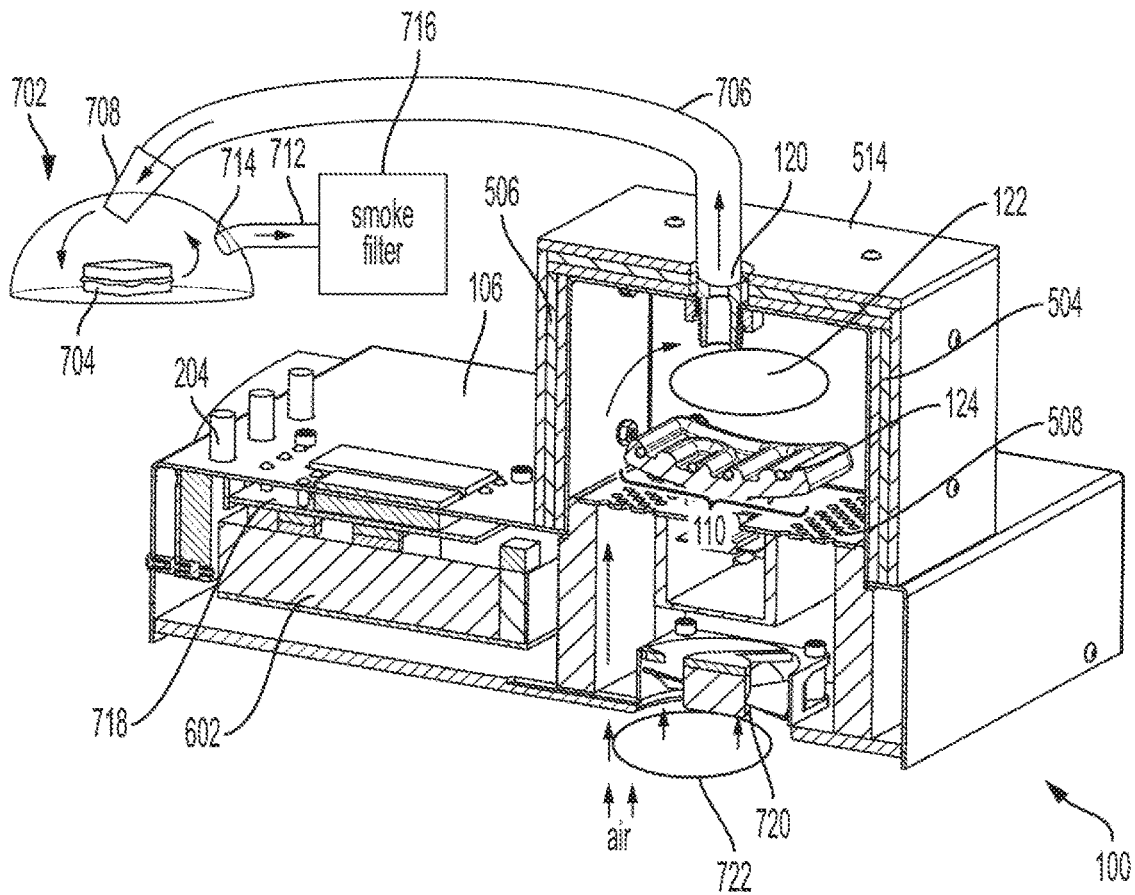
FIG. 7 depicts a cutaway view of the cold smoker.

FIG. 7 depicts a cutaway view of smoker 100 showing the airflow path and the coupling of the smoker 100 to a food package 702 containing food 704 to be cold smoked. As depicted, a first end of tube 706 is coupled to tubing attachment 516. Tubing tip 708 is inserted into an inlet vent 710 in the food packaging. Another piece of tubing 712 is coupled to outlet vent 714. The other end of tubing 712 is coupled to a smoke filter 716 which filters any smoked from the area before returning the air to the exterior environment. Tubing 712 and smoke filter 716 are optional, and the smoke from outlet vent 714 may simply be returned to the exterior environment. Smoke filter 716 may be a separate apparatus from smoker 100, if a user desires to use their own type of smoke filter 716. Alternatively, smoke filter 716 may be coupled to smoker 100 and fed power from power supply 604.

A temperature controller 718 (e.g., a printed circuit board) is provided for translating temperature inputs from smoker controls 102 to ignition plate 110 and fan 720. The type of temperature controller 718 used to heat the ignition plate 110 preferably uses fuzzy logic PID (proportional-integral-derivative) technology that allows the ignition plate 110 to auto tune heating and cooling functions. For example, if the desired temperature is 500° F., the user will increase the temperature using temperature controls 202 until it is shown on primary display 206. The temperature controller 718 will heat ignition plate to exactly this temperature and will display the ignition plate's temperature on secondary display 208. This capability also allows for preset, programmed temperatures or selections to be entered. The temperature controller 718 will automatically heat ignition plate 110 to the corresponding temperature. Each material 112 or combination of materials has an optimal heat point, which varies from material to material.

To use smoker 100, a user first turn-ons on smoker 100 using power control switch 100. The user picks a selection for the placed material 112, such as natural wood chips, herbs, spices, or a blend, using setting buttons 210. Alternatively, the user can use temperature controls 202 to select a temperature for ignition plate 110. Each material 112 has a set temperature that is optimized for that specific material. For example, natural wood chips are heated to 700° F., while an Italian blend of garlic, onion and oregano is heated to 450° F. The temperature or "optimal smoke point" may be determined through extensive testing and experimentation. The memory of temperature controller 718 can also updated (e.g., via Wi-Fi) at a later point in time as new materials 112 become available. Preferably, the amount of material is ~1 tablespoon per smoking session.

The user next removes ignition chamber cover 108 and places material 112 directly on ignition plate 110 or on materials plate 122 as shown in FIG. 7. The ignition chamber cover 108 is then placed on lip 116 to form an airtight seal for ignition chamber 102. Preferably, one or more sensors detects the presence/absence of ignition chamber cover 108 (e.g., coupled to breaker 606), and fan 720 and ignition plate 110 do not function unless ignition chamber cover 108 is connected and properly sealed. This ensures that the "flavor" emitted through the heating process is captured.

The user then couples tubing tip 708 to inlet vent 710. If immediate evacuation of the smoke from food package 702 is not required, smoke filter 716 does not need to be immediately connected. The user then presses a "start" button from settings buttons 210 or power control switch 204 for ignition plate 110 which causes ignition plate 110 to heat to the correct temperature, causing materials 112 to emit smoke. As the ignition plate 110 begins to heat up, the blower fan 720 can be powered on using a switch 204. The fan 720 pushes the smoke through smoke vent 120, through tube 706 or manifold/series of ducting, and into food package 702.

Figure 8:
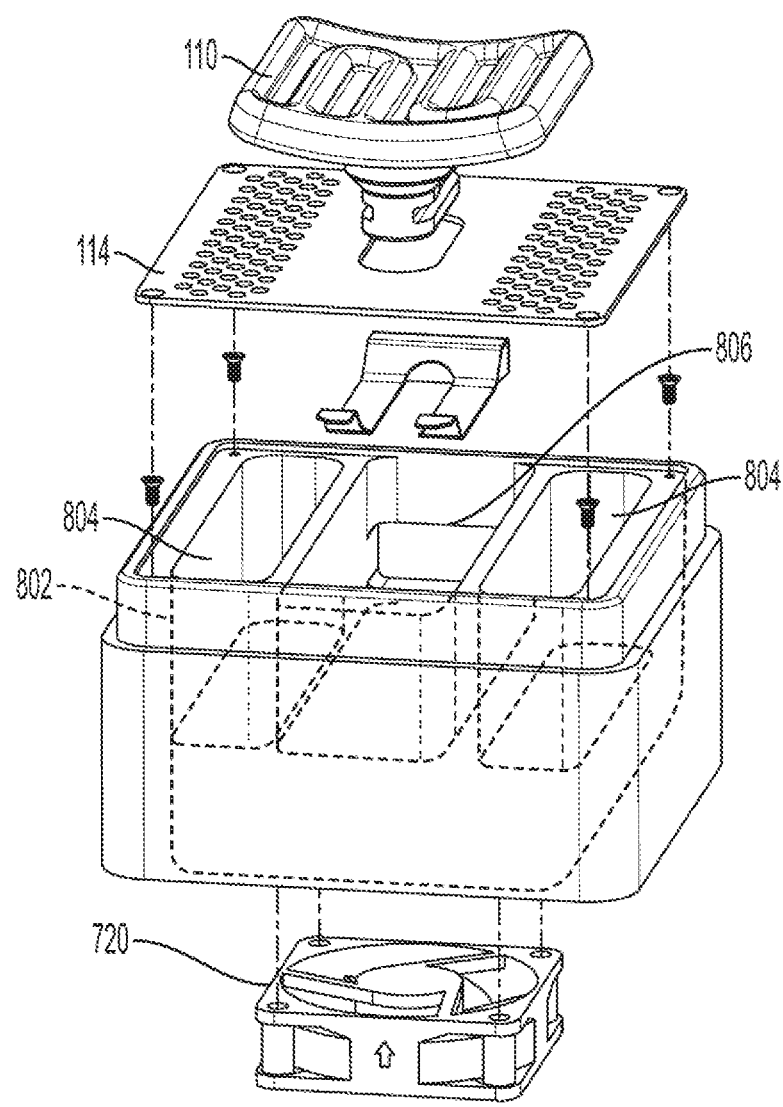
FIG. 8 depicts an exploded view of the fan and the ignition plate.

FIG. 8 depicts an exploded view of fan housing 802, vent plate 114, ignition plate 110, and fan 720. The fan 720 blows air upward through side ducts 804, but not central section 806. This helps to cause convection within ignition chamber 102. The section of vent plate 114 directly above fan 720 does not contain any vent sections 118 to prevent ashes or other debris from falling into fan 720.

Figure 9:
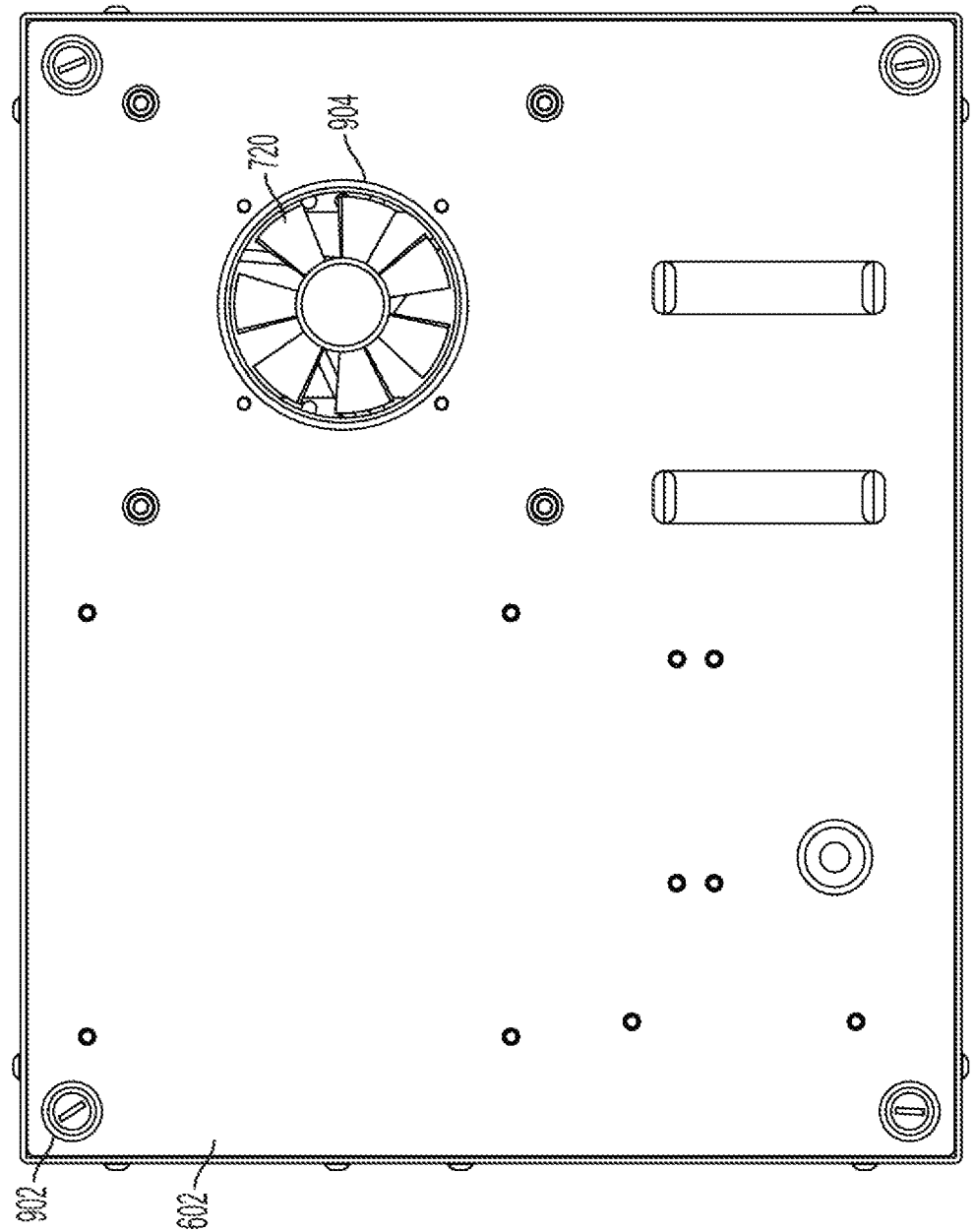
FIG. 9 depicts a bottom view of the smoker base.

FIG. 9 depicts a bottom view of smoker base 602. A plurality of adjustable feet 902 allow smoker 100 to sit level and raise base 602 slightly off of the surface on which it is placed. A fan opening 904 is provided in smoker base 602 to allow fan 720 to suck in air to fan housing 802.

Turning back to FIG. 7, fan 720 can be of any size, with a preferably diameter of 50 mm. Preferably the fan 720 is located directly below the ignition plate 110 as depicted to blow or push the smoke up from ignition plate 110 into smoke vent 120.

In another embodiment, the fan 720 may be placed above the ignition plate 10 suck/pull the smoke upward and into smoke vent 120. However, this may lower the lifespan of fan 720 of the residue buildup from the flavor passing through the fan 720. In addition, because some materials 112 are heated to a temperature in excess of 700° F., fan 720 may experience thermal breakdown over time.

In some embodiments, a filter 722 may be placed above or below the fan 720 to reduce the amount of residue buildup on the fan 720. However, filter 722 may lead to reduced airflow. A filter 722 placed over fan opening 904 can be used to block dirt and debris particles that may be sucked through fan opening 904 by the fan 720 from the outside environment.

In some embodiments, the speed of fan 720 may be adjustable using setting buttons 210 or smoker controls 106 to allow a user to control the flow of smoke to food package 702. The fan 720 may or may not have a preset setting that allows the fan 720 to run at a higher speed/RPM immediately upon getting started, then automatically lowering the RPM to the desired speed that will remain at that speed until the flavor has been fully imparted into the food package 702. Once the fan 720 runs for the preset/preprogrammed amount of time, it may or may not automatically enter into a "Shut Down Cycle" to allow the fan 720 to gradually turn off, thus extending the life of the fan and its components. Optionally, after the fan 720 turns off and/or ignition chamber 102 is again safe to open, smoker 100 may emit an alert such as a sound or alarm to let the user know the smoking process is complete.

Tubing 706 and 712 is preferably made from plastic or rubber that is Food and Drug Administration (FDA) approved. Outside of using FDA approved grade material, the tubing 706 and 712 used can vary in size, length and durometer. The reason the tubing 706 or 712 needs to be FDA grade is because it will be in contact with the flavor that is then imparted into the food 704. Tue tubing 706 and 712 is preferably 70 A durometer tubing which allows for optimal airflow without kinking in the tube. However, the tubing 706 and 712 is preferably in the range of 55 A-90 A. Tubing with a smaller durometer A tube with 50 A durometer is too flexible and will easily kink, creating an airflow blockage which leads to a pressure buildup inside the ignition chamber 102.

Preferably, tubing 706 and/or 712 is approximately 12" in length which allows flexibility in attaching tubing tip to inlet vent 710 without losing significant pressure. If tubing 706 is too long, a number of factors have to be adjusted on smoker 100 to ensure the smoke is delivered to the food (e.g., fan speed, diameter, and durometer of the tubing).

Tubing tip 708 is preferably a FDA plastic grade tip that is tapered to allow easy insertion into inlet vent 710 while not impeding the smoke flow. If tubing tip 708 is too narrow at the tip, smoke will not flow into food package 702.

The speed of fan 720 creates pressure and forces the smoke into food package 702. As the flavor enters into the food packaging 702 or chamber, pressure is created inside the packaging 702 or chamber. Outlet vent 714 ensures a positive pressure in the packaging 702 or chamber. If outlet vent 720 is not provided, positive pressure will not be created inside the packaging 702 or chamber and the incoming flavor will simply sit inside the packaging as well as get backed up in the tubing 706 and ignition chamber 102.

Outlet vent 714 allows the current air inside the food packaging 702 or chamber to escape, creating a positive pressure and allowing the flavor to fully engulf the food 704 inside the packaging or chamber. The existing air in the food packaging or chamber needs to vent out of the package 702 or chamber in order for the incoming flavor/smoke/air to enter. As the flavor/smoke enters into the packaging 702 or chamber, the chamber 702 or packaging seals in the flavor or smoke, which allows for control of how long the food 704 is infused for. The duration in which the food 704 is exposed to the flavor results in varying flavor profiles. This duration that the food 704 is exposed to the flavor is determined by the type of material being heated, the amount of material being heated, the temperature in which is heated, the speed of the fan 720, as well as the size of the outlet vent 714 in the packaging.

Preferably, inlet vent 710 and outlet vent 714 are the same size to create an even amount of pressure in the food packaging 702 or chamber. Varying size holes for both the entry and exit holes are used to create varying amounts of pressure, which will create the food to absorb more or less flavor.

Finally, after the food 704 is smoked, the ignition chamber cover 108 is removed and the pan 302 is inserted as depicted in FIG. 4. The user can use a standard, metal brush to brush the ash onto the pan 302. Once all the ash has been brushed off the plate, the user can simply remove the ash pan 302 and discard the ash into the garbage.

A user can use smoker 100 to cold smoke all types of foods such as meats, cheeses, condiments and dips, breads as well as warm/heated sandwiches, pre-made sandwiches and made to order sandwiches. Smoker 100 may also heat/cook the sandwich and then control temperature smoke it.

Any type of wood chip can be used as a material 112 to controlled temperature smoke a sandwich. Alternatively, different aromas, textures, liquids, and solids such as herbs, spices or a blend can be heated and/or vaporized to release scents and flavors that can infuse and change the smell and taste of the food 704.

Smoker 100 may have different form factors depending upon intended use: a foodservice/commercial version that can be used in foodservice and retail environments as well as a residential version that can be used at home by the general public.

The invention claimed is:

1. A smoker comprising:
   a blower fan;
   an ignition plate positioned above the blower fan,
   wherein a top surface of the ignition plate has a concave surface;
   an ignition chamber cover for removably covering the ignition plate to create an ignition chamber;
   a smoke outlet on a top surface of the ignition chamber cover, located above the ignition plate when the ignition chamber cover covers the ignition plate, for releasing smoke from the ignition chamber to smoke a product;
   a control panel for controlling a speed of the blower fan or a temperature setting of the ignition plate;
   a temperature controller for controlling a temperature of the ignition plate in response to the temperature setting from the control panel;
   a vent plate having a plurality of vent areas,
   wherein each of the plurality of vent areas comprises a plurality of vents,
   wherein the vent plate is positioned above the blower fan and below the ignition plate,
   wherein the plurality of vent areas do not extend directly under a bottom surface or periphery of the ignition plate,
   wherein the blower fan blows air through the plurality of vent areas and blows smoke out the smoke outlet for smoking the product, and
   wherein the blower fan causes a chimney effect for the air and the smoke within the ignition chamber.

2. The smoker according to claim 1, further comprising:
   a section of tubing coupled to the smoke outlet for directing smoke from the ignition chamber to an inlet of a food container.

3. The smoker according to claim 1, further comprising:
   a materials plate having a same shape as the top surface of the ignition plate, wherein materials smoked in the smoker are placed on the materials plate.

4. The smoker according to claim 1, wherein an air inlet of the blower fan is covered by a debris filter.

5. The smoker according to claim 1, wherein the ignition chamber cover further comprises:
   a plurality of sidewalls,
   wherein each sidewall of the plurality of sidewalls is formed from an outer layer, a middle layer, and an inner layer.

6. The smoker according to claim 5, wherein the outer layer and the inner layer are formed from stainless steel, and wherein the middle layer is formed from an insulating material.

7. The smoker according to claim 1, wherein the ignition plate is a ceramic infrared heater with an operating range of 400°-800° F.

8. The smoker according to claim 7, wherein the ignition plate comprises a plurality of thermocouples spaced in the ceramic infrared heater.

9. The smoker according to claim 1, further comprising:
   a pan having a handle and a base with a longitudinal cutout,
   wherein a size of the base is approximately the same as a size of the vent plate, and a length of the cutout is approximately half a length of the vent plate.

10. The smoker according to claim 1, wherein the vent plate comprises a raised lip surrounding the vent plate, and wherein a bottom surface of the ignition chamber cover releasably mates with the raised lip to form an airtight seal in the ignition chamber.

11. A smoker system comprising:
   a cold smoker comprising:
   a blower fan;
   a vent plate having a plurality of vent holes,
      wherein the vent plate is centered in a position directly above the blower fan, and
   an ignition plate centered above the blower fan,
      wherein the plurality of vent holes are not located in any area of the vent plate directly below a bottom surface of the ignition plate, and
      wherein the vent plate is positioned above the blower fan and below the ignition plate;
   at least one material to be smoked placed on a top surface of the ignition plate;
   an ignition chamber cover for removably covering the ignition plate to create an ignition chamber;
   a smoke outlet on a center of a top surface of the ignition chamber cover for releasing smoke from the ignition chamber;
   a control panel for controlling a speed of the blower fan or a temperature setting of the ignition plate; and
   a temperature controller for controlling a temperature of the ignition plate in response to the temperature setting from the control panel; and
   a section of tubing with a first tubing tip coupled to the smoke outlet and a second tubing tip; and
   a food container for receiving smoke from the smoke outlet, the food container comprising:
      an inlet opening coupled to the second tubing tip;
      a chamber for holding one or more food products; and
      an outlet opening for evacuating smoke and air from the chamber.

12. The smoker according to claim 11, wherein the outlet opening is coupled to a section of an outlet tubing that evacuates the smoke and the air from the chamber to a smoke filter.

13. A method for cold smoking a food product using a smoker, the method comprising:
   placing a material to be smoked on a top surface of an ignition plate of the smoker;
   selecting a smoking temperature for the ignition plate using a temperature control panel;
   covering the ignition plate with an ignition chamber cover to form an airtight seal surrounding the ignition plate;
   powering the ignition plate to cause the ignition plate to reach the smoking temperature and cause the material to smoke;
   powering a blower fan to cause smoke to exit a smoke outlet on a top surface of the ignition chamber cover; and
   coupling a section of tubing from the smoke outlet to a smoke inlet of a container holding the food product to allow the food product to be cold smoked,
   the smoker comprising:
   a vent plate having a plurality of vent areas,
      wherein the vent plate is positioned above the blower fan and below the ignition plate,
      wherein the plurality of vent areas are not located on the vent plate in an area under a bottom surface of the ignition plate or a periphery of the ignition plate, and
      wherein the blower fan blows air through the plurality of vent areas towards the smoke outlet to create a chimney effect within the ignition chamber.

14. The method according to claim 13, further comprising:
   coupling an outlet of the container to a smoke filter for evacuating smoke from the container.

15. The method according to claim 13, wherein the material is selected from wood chips, herbs, or a combination thereof.

16. The method according to claim 13, wherein the ignition plate is an electric heating element.

17. The method according to claim 16, wherein the electric heating element is a coil, a cartridge, a cast-in heater, a ceramic infrared heater, or a flexible kapton heater.

* * * * *